United States Patent
Tidesten et al.

(10) Patent No.: US 12,421,582 B2
(45) Date of Patent: *Sep. 23, 2025

(54) STAINLESS STEEL

(71) Applicant: UDDEHOLMS AB, Hagfors (SE)

(72) Inventors: Magnus Tidesten, Hagfors (SE); Eva Sjöqvist Persson, Hagfors (SE); Magnus Brännbacka, Kristinehamn (SE)

(73) Assignee: UDDEHOLMS AB, Hagfors (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,343

(22) Filed: Feb. 21, 2023

(65) Prior Publication Data

US 2023/0193437 A1  Jun. 22, 2023

Related U.S. Application Data

(62) Division of application No. 16/650,596, filed as application No. PCT/SE2018/051019 on Oct. 4, 2018, now Pat. No. 11,591,678.

(30) Foreign Application Priority Data

Oct. 5, 2017  (SE) .................................. 1751230-2

(51) Int. Cl.
| | |
|---|---|
| *C22C 38/02* | (2006.01) |
| *B22F 1/00* | (2022.01) |
| *B22F 9/08* | (2006.01) |
| *C21D 1/25* | (2006.01) |
| *C21D 1/32* | (2006.01) |
| *C21D 6/00* | (2006.01) |
| *C21D 6/02* | (2006.01) |
| *C22C 33/02* | (2006.01) |
| *C22C 38/00* | (2006.01) |
| *C22C 38/04* | (2006.01) |
| *C22C 38/44* | (2006.01) |
| *C22C 38/46* | (2006.01) |
| *B33Y 70/00* | (2020.01) |

(52) U.S. Cl.
CPC ............... *C22C 38/02* (2013.01); *B22F 1/00* (2013.01); *B22F 9/082* (2013.01); *C21D 1/25* (2013.01); *C21D 1/32* (2013.01); *C21D 6/004* (2013.01); *C21D 6/005* (2013.01); *C21D 6/008* (2013.01); *C21D 6/02* (2013.01); *C22C 33/0285* (2013.01); *C22C 38/001* (2013.01); *C22C 38/04* (2013.01); *C22C 38/44* (2013.01); *C22C 38/46* (2013.01); *B22F 2301/35* (2013.01); *B33Y 70/00* (2014.12); *C21D 2211/001* (2013.01); *C21D 2211/004* (2013.01); *C21D 2211/008* (2013.01)

(58) Field of Classification Search
CPC ........ B22F 1/00; B22F 10/20; B22F 2301/35; B22F 2998/10; B22F 3/15; B22F 3/20; B22F 9/082; B33Y 70/00; Y02P 10/25; C21D 1/18; C21D 1/25; C22C 33/0285
See application file for complete search history.

(56) References Cited

U.S. PATENT DOCUMENTS

| | | | |
|---|---|---|---|
| 5,641,453 A | 6/1997 | Hackl et al. | |
| 5,846,289 A | 12/1998 | Rao | |
| 6,409,846 B1 * | 6/2002 | Takemura | F16C 33/62 |
| | | | 148/326 |
| 11,591,678 B2 * | 2/2023 | Tidesten | C22C 38/001 |
| 2007/0025873 A1 * | 2/2007 | Magee | C22C 38/04 |
| | | | 420/61 |

FOREIGN PATENT DOCUMENTS

| | | |
|---|---|---|
| CN | 1557985 A | 12/2004 |
| JP | H01275737 A | 11/1989 |
| JP | H04116139 A | 4/1992 |
| JP | 10586435 A | 4/1993 |
| JP | H11335782 A | 12/1999 |
| JP | 2000226641 A | 8/2000 |
| JP | 2000337389 A | 12/2000 |
| JP | 2007277639 A | 10/2007 |
| JP | 2008133499 A | 6/2008 |
| RU | 2425170 C2 | 7/2011 |
| WO | 0248418 A1 | 6/2002 |
| WO | 2015126311 A1 | 8/2015 |

OTHER PUBLICATIONS

NPL: on-line translation of JP 2007277639 A, Oct. 2007 (Year: 2007).*
Chinese Office Action dated Apr. 2, 2021, for Chinese Patent Application No. 201880064813.3.
Chinese Office Action dated Nov. 10, 2021, for Chinese Patent Application No. 201880064813.3.
Eurasian Office Action dated Oct. 26, 2021, for Eurasian Patent Application No. 202090880.
European Office Action dated Nov. 4, 2020, for European Patent Application No. 18864586.5.
Indian Office Action dated Mar. 17, 2022, for Indian Patent Application No. 202047018697.
International Search Report for Application No. PCT/SE2018/0510019, dated Nov. 27, 2018.
Japanese Office Action dated Aug. 3, 2022, for Japanese Patent Application No. 2020-519038.
Korean Office Action dated Jan. 9, 2023, for Korean Patent Application No. 10-2020-7011403.

(Continued)

*Primary Examiner* — Jie Yang

(74) *Attorney, Agent, or Firm* — KARCESKI IP LAW, PLLC

(57) ABSTRACT

A plastic forming mold made from a stainless steel, having in weight % (wt. %): C 0.32-0.50, Si 0.1-1.0, Mn 0.1-0.8, Cr 11-14, Mo 1.8-2.6, V 0.35-0.70, N 0.05-0.19, optional elements, and a balance of Fe apart from impurities. The stainless steel is hardened and tempered and has a matrix comprising ≥90 vol. % martensite.

15 Claims, No Drawings

(56) References Cited

OTHER PUBLICATIONS

Supplemental European Search Report dated Oct. 23, 2020, for European Patent Application No. 18864586.5.
Taiwanese Office Action dated Mar. 7, 2024, for Taiwanese Patent Application No. 107134957.

* cited by examiner

STAINLESS STEEL

CROSS-REFERENCE TO RELATED APPLICATION(S)

This patent application is a divisional patent application from U.S. patent application Ser. No. 16/650,596, filed on Mar. 25, 2020, which is a National Stage Entry patent application from International PCT Patent Application No. PCT/SE2018/051019, filed on Oct. 4, 2018, and which relies on and claims priority to Swedish Patent Application No. SE 1751230-2, filed on Oct. 5, 2017, the entire contents of all of which are incorporated herein by reference.

FIELD OF THE INVENTION

The invention relates to a stainless steel. In particular, the invention is directed to a stainless steel suitable for plastic forming moulds requiring a high hardness and a high toughness as well as a good corrosion resistance. The invention is also directed to plastic forming moulds made of the inventive steel.

DESCRIPTION OF THE RELATED ART

It is known to use stainless steel, in particular 400 series stainless steel like AISI 420 and AISI 440 as material for plastic forming moulds. However, these steels are prone to carbide segregation and to formation of delta ferrite. Substantial amounts of retained austenite may also be present in the hardened and tempered condition in these steels. The mechanical properties are therefore not optimal for plastic mould applications.

The stainless steels having a medium carbon content of about 0.35 to 0.40 wt. % like steels of the type AISI 420, DIN 1.2316 and DIN 1.2085 as well as modifications thereof have a relatively good corrosion resistance but suffer from a relatively low hardness, which results in a limited wear resistance.

Stainless steels of the type AISI 440, such as AISI 440C, have a carbon content of about 1 wt. % and a good wear resistance. Steels of this type can obtain a hardness in the range of 58-60 HRC after tempering. However, these steels suffer from a reduced corrosion resistance, in particular after annealing in the temperature range of 470-500° C. Low temperature annealing at 200° C. can be used in order to obtain a hardness of 58-60 HRC and an adequate corrosion resistance. However, a serious drawback of the low temperature annealing is that the steel will be prone to cracking. In particular, cracking will occur during Electro Discharge Machining (EDM) or even after grinding. Hence, when used for plastic moulds the steel AISI 440C needs to be subjected to high temperature annealing in order to prevent cracking but then the corrosion resistance is impaired.

In addition, to the above drawbacks the steel AISI 440C has a low dimensional stability at heat treatment because of too high an amount of retained austenite.

SUMMARY OF THE INVENTION

The general object of the present invention is to provide a stainless steel, which is suitable as a material for plastic forming moulds. In particular, the stainless steel should be martensitic after hardening and have a high hardness, a high toughness and a good corrosion resistance even after high temperature annealing.

The foregoing objects, as well as additional advantages are achieved to a significant measure by providing a stainless steel as defined herein.

The steel has a property profile fulfilling the enhanced requirements for material properties raised by plastic mould makers.

DESCRIPTION OF EMBODIMENT(S) OF THE INVENTION

In the following the importance of the separate elements and their interaction with each other as well as the limitations of the chemical ingredients of the claimed alloy are briefly explained. Useful and preferred ranges are defined in the claims. All percentages of the chemical composition of the steel are given in weight % (wt. %) throughout the description. The amounts of hard phases are given in volume % (vol. %). Upper and lower limits of the individual elements can be freely combined within the limits set out in the claims. The arithmetic precision of the numerical limits can be increased by one digit. Hence, if the amount of an element is given as 0.1% it is also possible to express said value with a higher accuracy by increasing the effective number of digits to the right of the decimal point to 0.10%.

Carbon (0.32-0.50%)

Carbon is favourable for the hardenability and is to be present in a minimum content of 0.32%, preferably at least 0.34, 0.35, 0.36, 0.37 or 0.38%. At high carbon contents carbides of the type $M_{23}C_6$, $M_7C_3$ and $M_2C$, where M represents Cr, Fe, Mo, V or other carbide forming element, may be formed in the steel in too high an amount leading to a reduced toughness and corrosion resistance. Moreover, a high carbon content may also lead to an increased amount of retained austenite. The carbon content shall therefore not exceed 0.50%. The upper limit for carbon may be set to 0.48, 0.46, 0.44, 0.43 or 0.42%.

Silicon (0.1-1.0%)

Silicon is used for deoxidation. Si also improves the machinability of the steel. In order to get the desired effect, the content of Si should be at least 0.1%. However, Si is a strong ferrite former and increases the activity of carbon in the steel and should therefore be limited to 1.0%, preferably to 0.6, 0.5, 0.4, 0.35 or 0.3%.

Manganese (0.2-0.8%)

Manganese contributes to improving the hardenability of the steel and together with sulphur manganese it may contribute to improve the machinability by forming manganese sulphides. In addition, Mn increases the solubility of nitrogen in the steel. Manganese shall therefore be present in a minimum content of 0.2%, preferably at least 0.3, 0.35 or 0.40%. Manganese is an austenite stabilizing element and should be limited to 0.8, 0.7, 0.6, 0.5 or 0.4% in order to avoid too much residual austenite.

Chromium (11-14%)

Chromium is the most important element in stainless steels. When present in a dissolved amount of at least 11%, chromium results in the formation of a passive film on the steel surface. Chromium shall be present in the steel in an amount between 11 and 14% in order to give the steel a good hardenability and corrosion resistance. Preferably, Cr is present in an amount of more than 11.5% in order to safeguard a good pitting corrosion resistance. However, Cr is a strong ferrite former and in order to avoid ferrite after hardening the amount needs to be controlled. For practical reasons the upper limit may be reduced to 13.5, 13.0 or 12.5%.

Molybdenum (1.8-2.6%)

Mo is known to have a very favourable effect on the hardenability. It is also known to improve the pitting corrosion resistance. Molybdenum is also essential for attaining a good secondary hardening response. The minimum content may be 1.9, 2.0 or 2.1%. Molybdenum is a strong carbide forming element and also a strong ferrite former. The maximum content of molybdenum is therefore 2.6%. Preferably Mo is limited to 2.5, 2.4, or even 2.35%.

Vanadium (0.35-0.70%)

Vanadium forms evenly distributed primary precipitated carbonitrides of the type M(C,N) in the matrix of the steel. In the present steels M is mainly vanadium but Cr and some Mo may also be present. Vanadium shall therefore be present in an amount of 0.35-0.70%. The upper limit may be set to 0.65, 0.60 or 0.55%. The lower limit may be set to 0.40 or 0.45%.

Nitrogen (0.05-0.19%)

Nitrogen is restricted to 0.05-0.19% in order to obtain the desired type and amount of hard phases, in particular V(C, N). When the nitrogen content is properly balanced against the vanadium content, vanadium rich carbo-nitrides V(C,N) will form. These will be partly dissolved during the austenitizing step and then precipitated during the tempering step as particles of nanometer size. The thermal stability of vanadium carbo-nitrides is considered to be better than that of vanadium carbides such that a high hardening temperature may be used without a detrimental grain growth. Moreover, the tempering resistance of the stainless steel is improved. Further, by tempering at least twice, the tempering curve will have a high secondary peak. However, excessive additions may lead to the formation of pores. The lower limit may be 0.06, 0.07 or 0.08%. The upper limit may be 0.15, 0.14, 0.13, 0.12 or 0.11%.

Optional Elements

Aluminium (0.001-0.05%)

Aluminium may be used for deoxidation. In most cases the aluminium content is limited to 0.03%.

Nickel (≤1%)

Nickel gives the steel a good hardenability and toughness. Because of the expense, the nickel content of the steel should be limited. A preferred content is ≤0.5% or ≤0.35%. Most preferably, Ni is not deliberately added.

Copper (≤4%)

Cu is an optional element, which may increase the hardness of the steel by precipitation hardening. In addition, it contributes to the corrosion resistance of the steel as well as to the machinability. If used, preferred ranges are 0.5-2%. However, it is not possible to extract copper from the steel once it has been added. This drastically makes the scrap handling more difficult. For this reason, copper is normally not deliberately added.

Cobalt (≤3%)

Co is an optional element. It increases the MS temperature and contributes to increase the hardness of the martensite. The maximum amount is 3%. However, for practical reasons such as scrap handling there is no deliberate addition of Co. A preferred maximum content may be set to 0.15%.

Tungsten (≤0.8%)

Tungsten may be present at contents of up to 0.8%, without being too detrimental to the properties of the steel. However, tungsten tends to segregate during solidification and may give rise to undesired delta ferrite. In addition, tungsten is expensive and it also complicates the handling of scrap. The maximum amount is therefore limited to 0.8%, preferably 0.5%, preferably no deliberate additions are made.

Niobium (≤0.1%)

Niobium is similar to vanadium in that it forms carbonitrides of the type M(C,N). The maximum addition of Nb is 0.1%. Preferably, niobium is not deliberately added. The permissible impurity content may be set to 0.01, 0.005, 0.003 or 0.001%.

Sulphur (≤0.2%)

S contributes to improving the machinability of the steel. A suitable content for improving the machinability of the steel in the hardened and tempered condition is 0.07-0.15%. At high sulphur contents there is a risk of red brittleness. Moreover, a high sulphur content may have a negative effect on the fatigue properties of the steel. The steel shall therefore contain ≤0.2%. However, sulphur is preferably limited to S≤0.004% in order to reduce the number of inclusions. The sulphur content may be very low, such as ≤0.002% or preferably ≤0.001%, for improving the mechanical properties of the steel.

Oxygen

Oxygen is an undesired impurity element, which forms non-metallic inclusions in the steel. The permissible impurity content may be set to 0.005, 0.003, 0.0015 or 0.001%.

Calcium (Optionally 0.01%)

Calcium may be deliberately added to the steel during ladle treatment in order to form inclusions of a desired composition and shape.

Be, Se, Mg and REM (Rare Earth Metals)

These elements may be added to the steel in the claimed amounts in order to further improve the machinability, hot workability and/or weldability.

Boron (≤0.01%)

B may be used in order to further increase the hardness of the steel. The amount is limited to 0.01%, preferably ≤0.003%.

Ti, Zr and Ta

These elements are carbide formers and may be present in the alloy in the claimed ranges for altering the composition of the hard phases. However, normally none of these elements are added. The permissible impurity contents may be set to 0.01, 0.005, 0.003 or 0.001%.

PRE

The pitting resistance equivalent (PRE) is often used to quantify pitting corrosion resistance of stainless steels. A higher value indicates a higher resistance to pitting corrosion. For nitrogen alloyed martensitic stainless steels the following expression may be used:

$$PRE = \% \, Cr + 3.3\% \, Mo + 30\% \, N$$

wherein % Cr, % Mo and % N are the contents dissolved in the matrix at the austenitizing temperature ($T_A$). The dissolved contents can be calculated with Thermo-Calc for the actual austenitizing temperature ($T_A$) and/or measured in the steel after quenching.

The austenitizing temperature ($T_A$) is in the range of 1000-1200° C., typically 1050-1080° C.

Steel Production

A stainless steel having the claimed chemical composition can be produced by conventional steel making or by powder metallurgy (PM). This type of steel is often made by melting scrap in an Electric Arc Furnace (EAF) then subjecting the steel to ladle metallurgy and, optionally, a vacuum degassing. Calcium may be added at the end of the metallurgical treatment, preferably as CaSi. However, this treatment is optional and it is only performed if there are special requirements on the machinability of the steel.

The melt is cast to ingots by ingot casting, suitably bottom casting. Powder metallurgical (PM) manufacture may be used but is restricted to special applications for cost reasons. On the other hand, steels for plastic moulds often require a high cleanliness. For this reason, one or more remelting steps such as VIM, VAR or ESR may be included in the processing route. In most cases ESR is the preferred route.

The steel can be subjected to homogenisation annealing as well as to soft annealing. The hardness after soft annealing at 860° C. is about 150-240 HBW, wherein the Brinell hardness $HBW_{10/3000}$ is measured with a 10 mm diameter tungsten carbide ball and a load of 3000 kgf (29400N).

The steel is subjected to hardening before being used. The steel can be heat treated to adjust the hardness in a similar way as used for type 400 series stainless steel.

The hardening temperature range is preferably in the range of 1050° C.-1080° C. because exceeding 1080° C. may result in grain growth, increased amount of retained austenite and/or grain boundary carbides. The holding time should be about 30 minutes followed by slow cooling. The cooling rate is defined by the time the steel is subjected to the temperature range 800° C. to 500° C., ($t_{800/500}$). The cooling time in this interval, $t_{800/500}$, should normally be in the range of 100 to 600 s in order to get the desired martensitic microstructure. Tempering is performed after letting the steel cool down to 50-70° C. The steel should be tempered two or three times with intermediate cooling to room temperature and the holding time at the tempering temperature is normally 2 hours. Preferably, two tempering steps are used (2×2 h). The tempering can be performed in different temperature regimes. Low temperature tempering at 180-270° C. results in the best corrosion resistance. High temperature tempering at 525-550° C. is good for the hardness but the corrosion resistance is lower than for tempering at a low temperature. As a compromise it is also possible to temper the steel at an intermediate temperature in the range of 470-490° C.

The main aspect of the invention is to provide a stainless steel consisting of in weight % (wt. %):

| | |
|---|---|
| C | 0.36-0.44 |
| Si | 0.1-0.5 |
| Mn | 0.2-0.6 |
| Cr | 11.5-13 |
| Mo | 2.1-2.5 |
| V | 0.40-0.60 |
| N | 0.06-0.12 |
| C + N | 0.45-0.53 |
| Al | 0.001-0.03 |
| Co | ≤0.5 |
| W | ≤0.5 |
| Nb | ≤0.008 |
| Ti | ≤0.01 |
| Zr | ≤0.01 |
| Ta | ≤0.01 |
| B | ≤0.003 |
| S | ≤0.002 |
| O | ≤0.001, |

The steel should preferably fulfil at least one of the following requirements (in wt. %):

| | |
|---|---|
| C | 0.36-0.44 |
| Si | 0.1-0.5 |
| Mn | 0.2-0.6 |
| Cr | 11.5-13 |
| Mo | 2.0-2.5 |
| V | 0.40-0.60 |
| N | 0.06-0.12 |
| C + N | 0.45-0.53 |
| Al | 0.001-0.03 |
| Ni | ≤0.5 |
| Cu | 0.5-2 |
| Co | ≤0.5 |
| W | ≤0.5 |
| Nb | ≤0.008 |
| Ti | ≤0.01 |
| Zr | ≤0.01 |
| Ta | ≤0.01 |
| B | ≤0.003 |
| P | ≤0.03 |
| S | ≤0.002 |
| O | ≤0.001 | and/or wherein the Equivalent Circle Diameter (ECD) of at least 80% of the carbides, nitrides and/or carbonitrides in the microstructure is less than 5 μm, wherein the ECD=$2\sqrt{A/\pi}$ where A is the surface of the carbide particle in the studied section.

The steel should preferably also fulfil at least one of the following requirements (in wt. %):

| | |
|---|---|
| C | 0.38-0.42 |
| Si | 0.1-0.3 |
| Mn | 0.4-0.5 |
| Cr | 11.6-12.4 |
| Mo | 2.1-2.4 |
| V | 0.45-0.55 |
| N | 0.07-0.11 |
| C + N | 0.46-0.52 |
| Al | 0.001-0.03 |
| Ni | ≤0.3 |
| S | ≤0.001 | and/or wherein the Equivalent Circle Diameter (ECD) of at least 80% of the carbides, nitrides and/or carbonitrides in the microstructure is less than 2.5 μm, wherein the ECD=$2\sqrt{A/\pi}$ where A is the surface of the carbide particle in the studied section.

The steel should most preferably fulfil the following requirements (in wt. %):

| | |
|---|---|
| C | 0.38-0.42 |
| Si | 0.1-0.3 |
| Mn | 0.4-0.5 |
| Cr | 11.6-12.4 |
| Mo | 2.1-2.4 |
| V | 0.45-0.55 |
| N | 0.07-0.11 |
| Al | 0.001-0.03 |
| Ni | ≤0.3 |

When the steel is in the soft annealed condition it should fulfil at least one of the following requirements:

a mean Brinell hardness of 150-300 $HBW_{10/3000}$, and/or wherein the steel has a width and/or thickness of at least 100 mm and the maximum deviation from the mean Brinell hardness value in the width and/or thickness direction measured in accordance with ASTM E10-01 is less than 10%, and wherein the minimum distance of the centre of the indentation from the edge of the specimen or edge of another indentation shall be at least two and a half times the diameter of the indentation and the maximum distance shall be no more than 4 times the diameter of the indentation, and/or the following maximum requirements with respect to micro-slag according to ASTM E45-97, Method A:

| A T | A H | B T | B H | C T | C H | D T | D H |
|---|---|---|---|---|---|---|---|
| 1.0 | 0 | 1.5 | 1.0 | 1.5 | 1.0 | 1.5 | 1.0 |

In the soft annealed condition, the steel should preferably fulfil at least one of the following requirements:

a mean Brinell hardness of 160-240 $HBW_{10/3000}$, and/or wherein the steel has a width and/or thickness of at least 100 mm and the maximum deviation from the mean Brinell hardness value in the width and/or thickness direction measured in accordance with ASTM E10-01 is less than 5%, and wherein the minimum distance of the centre of the indentation from the edge of the specimen or edge of another indentation shall be at least two and a half times the diameter of the indentation and the maximum distance shall be no more than 4 times the diameter of the indentation, and/or the following maximum requirements with respect to micro-slag according to ASTM E45-97, Method A:

| A T | A H | B T | B H | C T | C H | D T | D H |
|---|---|---|---|---|---|---|---|
| 0.5 | 0 | 1.5 | 0.5 | 1.0 | 0.5 | 1.5 | 1.0 |

When the steel is in the hardened and tempered condition it should preferably fulfil at least one of the following requirements:

the matrix comprises ≥90 vol. % martensite, the matrix comprises ≤4 vol. % austenite, the hardness is 55-62 HRC, the size of all AlN particles is ≤4 µm, the un-notched impact toughness is ≥50 J in the TL-direction at 58 HRC, the compressive yield strength $Rc_{0.2}$ is at 10-30% higher than tensile yield strength $Rp_{0.2}$.

The hardened and tempered steel may preferably fulfil at least one of the following requirements:

the matrix comprises ≥95 vol. % martensite, the matrix comprises ≤2 vol. % austenite, the hardness is 56-60 HRC, the size of all AlN particles is ≤3 µm, the un-notched impact toughness is ≥100 J in the TL-direction at 58 HRC.

According to the present invention, the steel may be provided in the form of prealloyed stainless steel powder obtained by atomizing a steel having a composition as defined herein.

The pre-alloyed powder can be used for making solid objects different methods such as hot isostatic pressing, powder extrusion and additive manufacturing. The powder can also be used for providing a surface layer on a substrate by thermal spraying, cold spraying or overlay welding.

Example 1

A steel composition according to the invention was prepared by conventional metallurgy. The compositions are shown in Table 1.

TABLE 1

Compositions of the examined steels.

| Element | Inventive steel Example 1 | Comparativ steel AISI 420 mod |
|---|---|---|
| C | 0.40 | 0.38 |
| Si | 0.20 | 0.90 |
| Mn | 0.43 | 0.53 |
| Cr | 11.9 | 13.6 |
| Mo | 2.24 | 0.01 |
| V | 0.49 | 0.31 |
| N | 0.09 | 0.01 |

The inventive steel was subjected to hardening by austenitizing at 1050-1080° C. for 30 minutes in a vacuum furnace and then gas quenched by nitrogen at 5 bar and thereafter tempered twice for two hours at 525° C. The results are shown in Table 2.

TABLE 2

Hardening results of the inventive steel

| Hardening Temp. ° C. | Tempering Temp. ° C. | Hardness HRC |
|---|---|---|
| 1050 | 525 | 57 |
| 1080 | 525 | 59 |
| 1100 | 525 | 61 |

The comparative steel was also subjected to hardening and tempering and the results are shown in Table 3.

TABLE 3

Hardening results of the comparative steel AISI 420C mod

| Hardening Temp. ° C. | Tempering Temp. ° C. | Hardness HRC |
|---|---|---|
| 1020 | 525 | 50 |
| 1050 | 525 | 54 |

It can be seen that the hardness of the comparative steel after tempering at 525° C. was significant lower than the hardness of the inventive steel.

The corrosion resistance of the inventive steel was found to be superior to the comparative steel AISI 420C mod in air-mist chamber tests. The tests were performed in 0.1 M NaCl for 2 hours at 35° C.

The pitting resistance equivalent (PRE) was also calculated for both steels using the following formula:

PRE=% Cr+3.3% Mo+30% N wherein % Cr, % Mo and % N are the contents dissolved in the matrix at the austenitizing temperature ($T_A$). The dissolved contents were calculated with Thermo-Calc using the databank TCFE7 for the austenitizing temperature ($T_A$), which was set to 1080° C. for the inventive steel and to 1030° C. for the comparative steel.

The inventive steel was found to have a calculated PRE of 20.9 whereas that of the comparative was found to be only 13.2.

Thus, the inventive steel not only had a higher hardness and tempering resistance but also a better corrosion resistance than the comparative steel.

Example 2

A steel composition according to the invention was prepared by conventional metallurgy including ESR.

TABLE 4

Composition of the examined steel.

| Element | Inventive steel Example 2 |
|---|---|
| C | 0.41 |
| Si | 0.18 |
| Mn | 0.46 |
| Cr | 12.0 |
| Mo | 2.25 |
| V | 0.50 |
| N | 0.085 |
| S | 0.0006 |
| Al | 0.009 |
| O | 0.0009 |

The steel was rolled to the dimension 250×80 mm and soft annealed. The hardness in the soft annealed condition was in the range of 182-197 $HBW_{10/3000}$. The hardness was measured in accordance with ASTM E10-01. The spacing between the indentations was 14 mm and the maximum deviation from the mean Brinell hardness value in the width direction was found to be 3.9%.

The microstructure was very uniform with small vanadium carbonitrides evenly distributed in the martensitic matrix. The Equivalent Circle Diameter (ECD) of >90% of the carbides, nitrides and/or carbonitrides in the microstructure was less than 2.5 μm, wherein the $ECD=2\sqrt{A/\pi}$ where A is the surface of the carbide particle in the studied section. AlN particles larger than 4 μm were not be detected.

The cleanliness was evaluated according to ASTM E45-97, Method A. The result given in Table 5 reveals that the steel was extremely clean, which also resulted in a very good polishability.

TABLE 5

Micro-slag according to ASTM E45-97, Method A.

| A T | A H | B T | B H | C T | C H | D T | D H |
|---|---|---|---|---|---|---|---|
| 0.0 | 0.0 | 0.5 | 0.0 | 0.0 | 0.0 | 1.0 | 0.5 |

The steel was subjected to hardening by austenitzing at 1020 and 1050° C. for 30 minutes then gas quenched by nitrogen at 5 bar and thereafter tempered twice for two hours at 250° C., 480° C. or 525° C., wherein the steel subjected to tempering at 480° C. was subjected to cooling in liquid nitrogen after quenching and before tempering. The results are shown in Table 6.

TABLE 6

Hardening results of the inventive steel

| Hardening Temp. ° C. | Tempering Temp. ° C. | Hardness HRC | Retained austenite (vol. %) |
|---|---|---|---|
| 1020 | 250 | 51.8 | <2 |
| 1020 | 525 | 53.3 | <2 |
| 1050 | 250 | 53.7 | 8 |
| 1050 (+Cryo) | 480 | 55.7 | <2 |
| 1050 | 525 | 56.1 | <2 |

The structure consisted of tempered martensite and only the steel 1050° C./250° C. (2×2) had a noticeable amount of retained austenite.

The un-notched impact toughness in the TL-direction, i.e. transverse to the longitudinal (rolling) direction, was found to be 337 J for the steel 1050° C./525° C. (2×2) with a hardness of 56.1 HRC.

The inventive stainless steel is very suitable for applications requiring a high hardness and a high toughness as well as a good corrosion resistance such as steels for plastic forming moulds.

The invention claimed is:

1. A plastic forming mold comprising an austenitized and tempered stainless steel, consisting of, in weight % (wt. %):

| | |
|---|---|
| C | 0.32-0.50 |
| Si | 0.1-1.0 |
| Mn | 0.1-0.8 |
| Cr | 11-13 |
| Mo | 2.1-2.6 |
| V | 0.35-0.70 |
| N | 0.05-0.19 |
| S | ≤0.004 |
| Al | 0.001-0.05 |
| optionally | |
| Co | ≤3 |
| W | ≤0.8 |
| Nb | ≤0.1 |
| Ti | ≤0.1 |
| Zr | ≤0.1 |
| Ta | ≤0.1 |
| B | ≤0.01 |
| Be | ≤0.2 |
| Se | ≤0.3 |
| Ca | ≤0.01 |
| Mg | ≤0.01 |
| REM | ≤0.2 |
| P | ≤0.03 |
| O | ≤0.005, and | balance Fe apart from impurities,
wherein the stainless steel has a matrix comprising ≥90 vol. % martensite, and
wherein, in the hardened and tempered condition, the stainless steel contains AlN particles with a size ≤4 μm.

2. The plastic forming mold according to claim 1, wherein the stainless steel fulfils at least one of the following requirements (in wt. %):

| | |
|---|---|
| C | 0.32-0.50 |
| Si | 0.1-1.0 |
| Mn | 0.1-0.8 |
| Cr | 11-13 |
| Mo | 2.1-2.6 |
| V | 0.35-0.70 |
| N | 0.05-0.19 |
| Al | 0.001-0.05 |
| S | ≤0.004 |
| optionally | |
| Ni | ≤1 |
| Cu | ≤4 |
| Co | ≤3 |
| W | ≤0.8 |
| Nb | ≤0.1 |
| Ti | ≤0.1 |
| Zr | ≤0.1 |
| Ta | ≤0.1 |
| B | ≤0.01 |
| Be | ≤0.2 |
| Se | ≤0.3 |
| Ca | ≤0.01 |

-continued

| | |
|---|---|
| Mg | ≤0.01 |
| REM | ≤0.2 | wherein the Equivalent Circle Diameter (ECD) of at least 80% of the carbides, nitrides and/or carbonitrides in the microstructure is less than 5 μm, and/or
wherein the ECD=$2\sqrt{A/\pi}$ where A is the surface of the carbide particle in the studied section.

3. The plastic forming mold according to claim 1, wherein the stainless steel fulfils at least one of the following requirements (in wt. %):

| | |
|---|---|
| C | 0.38-0.42 |
| Si | 0.1-0.5 |
| Mn | 0.2-0.6 |
| Cr | 11.5-13 |
| Mo | 2.1-2.5 |
| V | 0.40-0.60 |
| N | 0.06-0.12 |
| C + N | 0.45-0.53 |
| Al | 0.001-0.03 |
| S | ≤0.01, | wherein the Equivalent Circle Diameter (ECD) of at least 80% of the carbides, nitrides and/or carbonitrides in the microstructure is less than 2.5 μm, and/or
wherein the ECD=$2\sqrt{A/\pi}$, where A is the surface of the carbide particle in the studied section.

4. The plastic forming mold according to claim 1, wherein the stainless steel fulfils the following requirements (in wt. %):

| | |
|---|---|
| C | 0.38-0.42 |
| Si | 0.1-0.3 |
| Mn | 0.4-0.5 |
| Cr | 11.6-12.4 |
| Mo | 2.1-2.4 |
| V | 0.45-0.55 |
| N | 0.07-0.11 |
| Al | 0.001-0.03. |

5. The plastic forming mold according to claim 1, wherein the stainless steel fulfils the following maximum requirements with respect to micro-slag according to ASTM E45-97, Method A:

| AT | AH | BT | BH | CT | CH | DT | DH |
|----|----|----|----|----|----|----|----|
| 1.0 | 0 | 1.5 | 1.0 | 1.5 | 1.0 | 1.5 | 1.0. |

6. The plastic forming mold according to claim 5, wherein the stainless steel fulfils the following maximum requirements with respect to micro-slag according to ASTM E45-97, Method A:

| AT | AH | BT | BH | CT | CH | DT | DH |
|----|----|----|----|----|----|----|----|
| 0.5 | 0 | 1.5 | 0.5 | 1.0 | 0.5 | 1.5 | 1.0. |

7. The plastic forming mold according to claim 1, wherein, in the hardened and tempered condition, the stainless steel has a matrix comprising≤4 vol. % austenite.

8. The plastic forming mold according to claim 7, wherein the matrix comprises≤2 vol. % austenite.

9. The plastic forming mold according to claim 1, wherein, in the hardened and tempered condition, the stainless steel has a hardness of 55-62 HRC.

10. The plastic forming mold according to claim 9, wherein the hardness is 56-60 HRC.

11. The plastic forming mold according to claim 1, wherein the size of the AlN particles is ≤3 μm.

12. The plastic forming mold according to claim 1, wherein, in the hardened and tempered condition, the stainless steel has an un-notched impact toughness ≥50 J in the TL-direction at 58 HRC.

13. The plastic forming mold according to claim 12, wherein the un-notched impact toughness is ≥100 J in the TL-direction at 58 HRC.

14. The plastic forming mold according to claim 1, wherein, in the hardened and tempered condition, the stainless steel has a compressive yield strength $Rc_{0.2}$ that is 10-30% higher than tensile yield strength $Rp_{0.2}$.

15. The plastic forming mold according to claim 1, wherein, in the hardened and tempered condition, the matrix comprises ≥95 vol. % martensite.

* * * * *